April 20, 1954 F. A. LAGE 2,675,782
FEEDING TROUGH
Filed Feb. 13, 1950
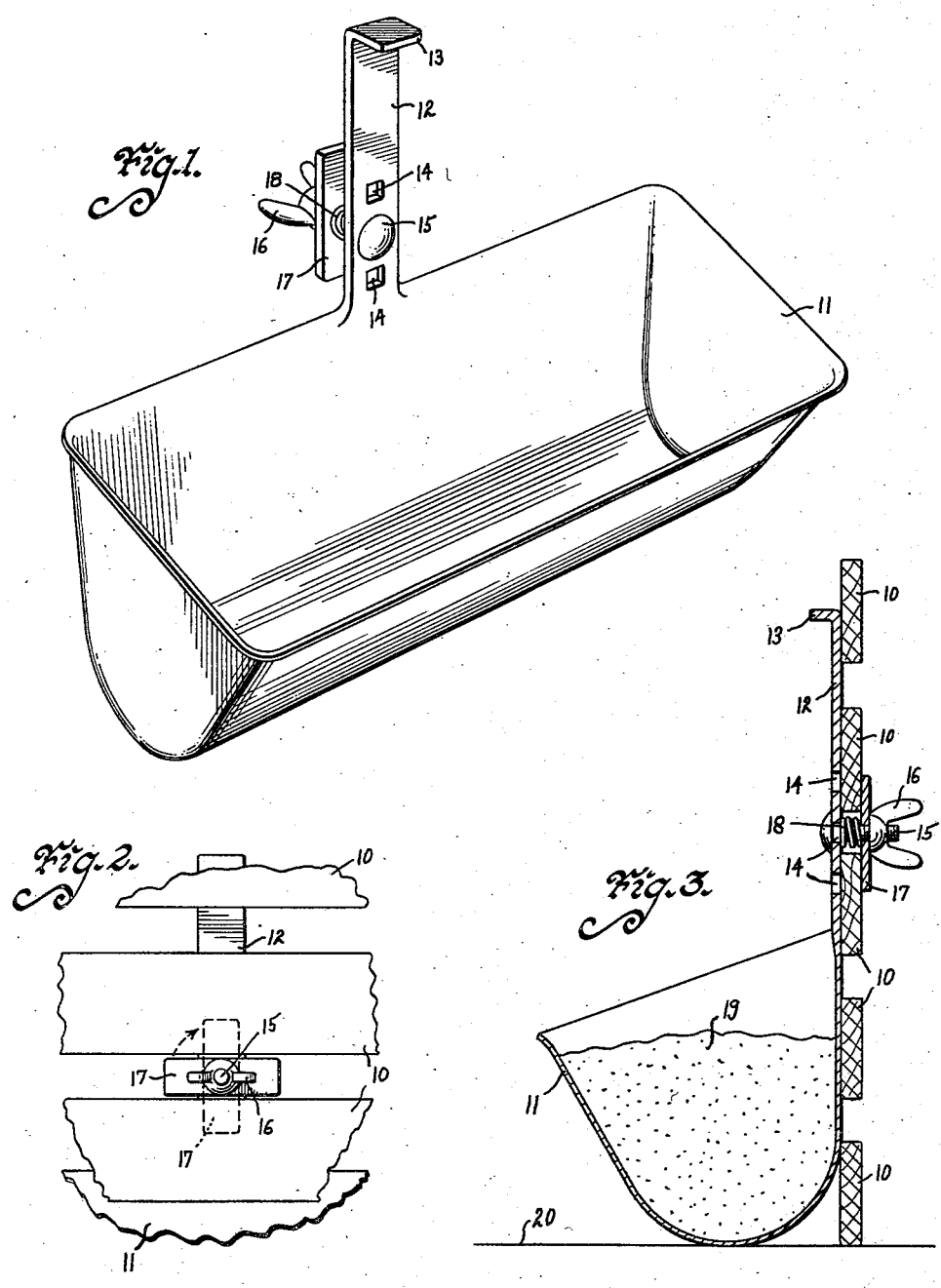
Inventor
Frederick A. Lage
by M. Talbert
Attorney
Witness
Edward P. Seeley Patented Apr. 20, 1954

2,675,782

UNITED STATES PATENT OFFICE 2,675,782

FEEDING TROUGH

Frederick A. Lage, Gladbrook, Iowa

Application February 13, 1950, Serial No. 144,018

5 Claims. (Cl. 119—61)

My invention relates to a feeding trough that is designed for use in hog houses and the like.

The principal object of my device is to provide a feeding trough that can be quickly and easily attached to or detached from the slatted walls of a hog house or the like without requiring the use of any tools or the like.

A further object of this invention is to provide a hog feeding trough that cannot be overturned by the hogs moving against it.

Still further objects of this device are to provide a feeding trough of the above classes that is easy to clean, economical in manufacture and durable in construction.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of this trough ready for use,

Fig. 2 is an outside view of a fragmentary portion of a slatted wall of a hog house or the like showing the manner in which this trough is detachably secured to the wall, and Fig. 3 is a cross-sectional view of this device shown secured to a slatted wall.

Referring to the drawings I have used the numeral 10 to designate spaced apart horizontal slat members that constitute the walls in a hog house or the like. Such slatted walls are in common use in such places and my device is more particularly adapted to use in connection with this type of wall. The numeral 11 designates an elongated trough member. An upwardly extending elongated metal strap arm member 12 is secured to the top of one longitudinal side of the trough at a point substantially midway between the ends thereof as shown in Fig. 1. The upper end of the arm 12 is bent towards the trough to form a hand grip member 13. In the bottom portion of the arm 12 I provide a plurality of vertically spaced openings 14. Preferably the openings 14 are square to receive the carriage bolt 15. A wing nut 16 is threaded on the shank end of the bolt 15 and a retaining bar member 17 is rotatably mounted on the bolt adjacent the nut 16. The numeral 18 designates a coil spring arranged on the bolt between the outside of the arm 12 and the retaining bar 17 as shown in Figs. 1 and 3. The numeral 19 designates feed placed within the trough 11.

In use, this feeding trough is designed to rest on a supporting surface 20 such as the ground or the floor in the hog house. It is secured to the slatted wall 10 in the following manner. The retaining bar 17 is placed in a position parallel with the slats and passed through the space between any two adjacent slats. It is then manually turned so as to be transverse to the longitudinal axis of the slats. In this position each end portion of the retaining bar engages one of the slats, as shown in Fig. 2.

The coil spring 18 is normally under tension to yieldingly hold the retaining bar 17 away from the arm 12. Thus, for any given slatted wall the wing nut 16 can be adjusted so that the space between the arm 12 and bar 17 will snugly accommodate the slats 10. Consequently, when this trough is periodically detached from and attached to the same wall, no further adjustment of the wing nut 16 is required and all that is necessary is to rotate the retaining bar.

The purpose of the plurality of openings 14 in the arm 12 is to provide a means for using this trough in most any hog house or the like having slatted walls. Since the trough rests on the floor or the ground, it is apparent that in different houses the relative position of the various spaces between slats will vary slightly. However, by providing the openings 14 it will be found that at least one of them will generally correspond to a space between slats on most any wall so that the trough can be secured thereto as above described.

This trough can easily be removed from the wall 10 for cleaning or for use at another location. The hand grip member 13 is provided to facilitate its handling and transporting when this is done. Another advantage of this trough is that it cannot be overturned or upset by the hogs pushing against it or rolling under it, which is one of the drawbacks on many feeding troughs now in use.

Some changes may be made in the construction and arrangement of my feeding trough without departing from the real spirit and purpose of my invention, and it is my intention to cover by my claims, any modified forms of structure or use of mechanical equivalents which may be reasonably included within their scope.

I claim:

1. In a device of the class described, a trough member, a strap arm member secured to one side of said trough; said strap member provided with an opening, a bolt member arranged in said opening and secured therein by a nut, a retaining bar member rotatably mounted on said bolt member, a yielding means on said bolt communicating on one end with said retaining bar and on its other end with said strap arm, said yielding means normally tending to hold said strap member and said retaining bar member away from each other, said nut when selectively tightened and loosened causing said yielding means to respectively contract and expand so that a variable spaced relationship between said strap member and retaining bar member can be provided as desired, and said retaining bar member capable of being manually rotatable without the necessity of rotating said nut.

2. In a device of the class described, a trough member, a strap arm member secured to one side of said trough; said strap member provided with an opening, a bolt member arranged in said opening, a retaining bar member rotatably mounted on said bolt member, a yielding means on said bolt communicating on one end with the inside of said retaining bar and on its other end with the outside of said strap arm, a nut on the end of said bolt member engageable with the outside of said retaining bar, said yielding means normally tending to hold said strap member and said retaining bar member away from each other, said nut when selectively tightened and loosened causing said yielding means to respectively contract and expand so that a variable spaced relationship between said strap member and retaining bar member can be provided as desired, and said retaining bar member capable of being manually rotatable without the necessity of rotating said nut.

3. In combination with a wall consisting of a plurality of spaced apart slat members; said wall resting on a supporting surface, a feeding trough comprising, a trough member, a strap arm member secured to one side of said trough; said strap member provided with a transverse opening, a bolt member arranged in said opening and secured therein by a nut, a retaining bar member rotatably mounted on said bolt member, a yielding means on said bolt communicating on one end with said retaining bar and on its other end with said strap arm; said device designed so that the bottom of said trough is capable of resting on said supporting surface adjacent one side of said wall and said strap arm will engage said slatted wall on the same side thereof with said retaining bar capable of being passed through the space between any two adjacent slats to engage at least one of said slats on the opposite side thereof and said retaining bar member capable of being manually rotated both for passage between the adjacent slats and for engagement therewith without the necessity of rotating said nut.

4. In combination with a wall consisting of a plurality of spaced apart slat members; said wall resting on a supporting surface, a feeding trough comprising, a trough member, an upwardly extending strap arm member secured to the top of one side of said trough; said strap member provided with a transverse opening, a bolt member arranged in said opening and secured therein by a nut, a retaining bar member rotatably mounted on said bolt member on the outside of said strap arm, a yielding means on said bolt intermediate and engaging the inner side of said retaining bar and outer side of said strap arm; said device designed so that the bottom of said trough is capable of resting on said supporting surface adjacent the inner side of said wall so said strap arm will engage said slatted wall on the inner side thereof with said retaining bar passed through the space between any two adjacent slats and engageable with at least one of said slats on the opposite side thereof and said retaining bar member capable of being manually rotatable both for passage between the two adjacent slats and for engagement with the outer side thereof without the necessity of rotating said nut.

5. In a device of the class described, a trough member, a strap arm member secured to one side of said trough; said strap member provided with an opening, a bolt member arranged in said opening, a retaining bar member rotatably mounted on said bolt member, a yielding means on said bolt communicating on one end with said retaining bar and on its other end with said strap arm a nut on said bolt engageable with the outer side of said retaining bar member, and said retaining bar member capable of being rotated without any prior rotating of said nut.

References Cited in the file of this patent

UNITED STATES PATENTS

| Number | Name | Date |
| --- | --- | --- |
| 233,421 | Keiper | Oct. 19, 1880 |
| 385,650 | Wemple | July 3, 1888 |
| 2,061,712 | Martin | Nov. 24, 1936 |
| 2,189,153 | Sanford | Feb. 6, 1940 |
| 2,599,844 | Kounkel | June 10, 1952 |

FOREIGN PATENTS

| Number | Country | Date |
| --- | --- | --- |
| 3,794 | Great Britain | 1902 |